United States Patent Office 3,108,991
Patented Oct. 29, 1963

3,108,991
WATER-SOLUBLE LINEAR POLYAMIDES AND COMPOSITIONS CONTAINING THE SAME
Joseph J. Pellon, New Canaan, Conn., and William G. Deichert, Flushing, N.Y., assignors to American Cyanamid Company, New York, N.Y., a corporation of Maine
No Drawing. Filed Aug. 7, 1961, Ser. No. 131,459
7 Claims. (Cl. 260—78)

This invention relates broadly to water-soluble polymeric materials and, more particularly, to water-soluble linear polymers. Still more particularly, the invention relates to synthetic water-soluble linear condensation polymers, specifically linear polyamides, in which a phosphine oxide (—P=O) grouping is an integral part of the polymer molecule. The scope of the invention also includes film-forming compositions comprising water and a water-soluble linear polyamide of the invention, e.g., those wherein the aforesaid linear polyamide constitutes from about 1% to about 20%, by weight, of the total amount of water and of the said polyamide.

Our new linear polymers have characteristic properties that make them especially valuable for use as or in film-forming compositions; and, therefore, are useful in adhesive, coating, impregnating and other applications. They are also useful as softeners or plasticizers, or as components of such compositions. In all these and other applications the water-soluble linear polyamides of this invention provide, in general, finished products or articles having better flame-resistant characteristics than are obtained by using similar polymers which do not contain such relatively large amounts of phosphorus in the polymer molecule.

The new linear polyamides with which this invention is concerned are formed by reaction between (1) a compound containing two amide-forming groups and (2) a diamine. They are further characterized by having a phosphine oxide-containing grouping as an essential component thereof. This grouping is derived from at least one (i.e., either or both) of the aforementioned components of (1) and (2). It can be represented by the general formula (I) 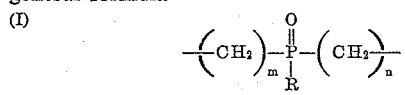

where R represents a lower alkyl radical (e.g., alkyl radicals containing from 1 to 5 carbon atoms, inclusive) and m and n each represent an integer from 1 to 5, inclusive, and which may be the same or different.

More specific examples of alkyl radicals represented by R in Formula I are methyl, ethyl, propyl, isopropyl, n-butyl, isobutyl, tert.-butyl, n-amyl and the various isomeric forms thereof, etc. Preferably R represents the methyl radical.

It was known prior to the present invention that difunctional reactants could be reacted under conditions such that there are formed linear condensation superpolymers that can be converted into commercially useful oriented filaments. The preparation of such linear condensation superpolymers is described in, for instance, Carothers U.S. Patents 2,071,250; 2,071,251; 2,071,253; 2,130,523; 2,130,948; and Morgan U.S. Patent 2,646,420. The last-named patent is directed to synthetic linear condensation polymers containing one or more phosphorus atoms as a part of the polymer chain, and having a recurring structural unit selected from the group consisting of (II) 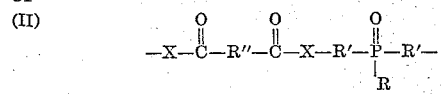

and (III) 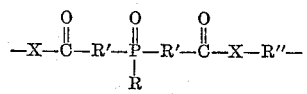

and (IV) 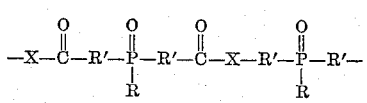

wherein R may be any monovalent hydrocarbon radical, R' is a divalent hydrocarbon radical from the group consisting of divalent aromatic and cycloaliphatic hydrocarbon radicals, R" may be any divalent hydrocarbon radical, and X is selected from the group consisting of nitrogen and oxygen. Various organophosphorus polymers have also been described by V. V. Korshak, Journal of Polymer Science, vol. XXXI, pp. 319–326 (1958).

The polymers, more particulraly water-soluble linear polyamides, of the present invention may be described more specifically as consisting essentially of the recurring unit structure represented by the general formula (V) 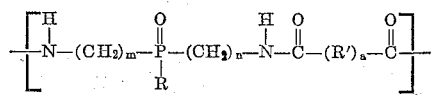

where R represents a lower alkyl radical, R' represents a divalent hydrocarbon radical containing from 1 to 8 carbon atoms and "a" is 0–1, inclusive, and m and n each represent an integer from 1 to 5, inclusive.

It will be understood by those skilled in the art that, when R' is zero in Formula V, there is no divalent hydrocarbon radical between the groups adjacent thereto, i.e., the two

groups, and that these groups are then attached directly to each other.

In another embodiment of the invention, our new polyamides may be described as consisting essentially of the recurring unit structure represented by the general formula (VI) 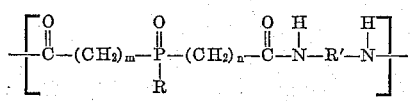

where R represents a lower alkyl radical, R' represents a divalent hydrocarbon radical containing from 1 to 8 carbon atoms, inclusive, and m and n each represent an integer from 1 to 5, inclusive.

In still another embodiment of the present invention, the water-soluble polyamides may be described more specifically as consisting essentially of the recurring unit structure represented by the general formula (VII) 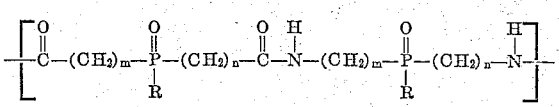

where each R represents a lower alkyl radical, and m and n each represent an integer from 1 to 5, inclusive.

Illustrative examples of divalent hydrocarbon radicals containing from 1 to 8 carbon atoms, inclusive, that are represented by R' in Formulas V and VI are: divalent aliphatic, e.g., methylene, ethylene, propylene (trimethylene), propenylene, butylene, butenylene, isobutylene, pentylene to octylene, including divalent cycloaliphatic containing up to 8 carbon atoms, e.g., cyclopentylene, cyclopentenylene, cyclohexylene, cyclohexenylene, cycloheptylene, etc.; phenylene; the various mono- and dimethylphenylenes; the various diethylphenylenes; benzylene; phenylethylene; phenylene-ethyl; etc. Specific examples of lower alkyl radicals represented by R in Formulas V, VI and VIII have been given hereinbefore.

The present invention is based on our discovery that linear polyamides of the kind broadly described in the third paragraph of this specification and, more particularly, those consisting essentially of recurring unit structures represented by Formulas V, VI and VII have a unique and valuable combination of properties which, to the best of our knowledge and belief, is not found in any other single film-forming composition including the linear polyamides of the prior art. Their water-solubility makes them economical to use in applications where solutions of polymers normally are employed. This is a matter of considerable commercial and practical importance. The films deposited either from a melt or a solution of the linear polyamides of the invention are flexible and tough.

The polymers of the invention have molecular weights, as measured by viscosities of solutions thereof, which are sufficiently high for all of the usual film-forming applications. Thus, they show, in general, "reduced viscosities" of at least 0.1 dl. (deciliter)/g., for instance, from about 0.15 to about 1.5 dl./g. and higher. These values for reduced viscosity are based on determinations made in formic acid at 30° C. using a Cannon-Obbelodhe viscometer. The term "reduced viscosity" as used herein is the ratio, $\eta_{sp}/C$, at a concentration of 0.1 g./100 cc.

Surprisingly, the softening and flow points of our new linear polymers are relatively low. Thus, for instance, the linear polyamide obtained by condensing the diamine, bis(3-aminopropyl)methylphosphine oxide, and sebacic acid softens at 40° C. and flows at 70°–80° C.; the one secured by condensing the same phosphine oxide-containing diamine with adipic acid softens at 90° C. and flows at 165° C.; while the one obtained by condensing the same diamine with terephthalic acid softens at 102°–105° C. and flows at 140°–160° C.

Our new polymers are hard solids at normal temperature. Some of them, especially those of lower melting point, tend to become tacky upon exposure to air containing a normal amount of moisture. Some are colorless, while others vary in color from pale yellow to orange-colored bodies. They have excellent adhesion to metals such as aluminum, steel and copper when applied from a melt or from an aqueous or organic-solvent solution. This characteristic combined with their flexibility and toughness makes them particularly valuable and useful as compositions for coating metals and the like.

The bonding strengths of the polyamides of this invention are surprisingly high. For example, tensile strengths as high as 10,000 p.s.i. have been obtained in bonds between two pieces of aluminum; 7,000 p.s.i., between two pieces of copper; and 5,300 p.s.i., between two pieces of steel. These p.s.i. values are the average of five determinations. It was unobvious and unexpected that a water-soluble adhesive should provide such strong bonds.

The unobvious and extremely valuable combination of properties described above taken with their film-forming and flame-resisting capabilities, increases the field of utility of the general class of linear polyamides and especially such polyamides which contain phosphorus (including those which contain —P=O) in the molecule.

The linear polyamides of the present invention are prepared, for example, by effecting a condensation reaction between the reactants of (1) and (2) broadly described in the third paragraph of this specification.

In one embodiment difunctional reactant (1) is represented by the general formula (VIII) 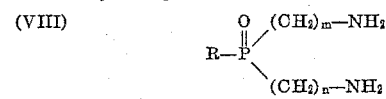

where R, m and n have the same meanings as given hereinbefore with reference to Formula I. In this embodiment difunctional reactant (2) can be, for example, a compound represented by the general formula (IX) 

where R' has the same meaning as given hereinbefore with reference to Formula V, and X represents an amide-forming grouping. From the foregoing it will be seen that the difunctional reactant of (2) can be a dicarboxylic acid or anhydride, or an amide-forming derivative of such an acid or anhydride (if available), wherein the carboxy (or other amide-forming) groups are attached directly to each other (in the case of, for example, an ester of oxalic acid) or to a divalent hydrocarbon radical having from 1 to 8 carbon atoms, inclusive. Instead of the carboxylic acids or the available anhydrides, one can use, for instance, the corresponding acyl chlorides, acyl bromides or other acyl halides (dihalides) of the particular carboxylic acid, or the corresponding nitrile or ester.

In another embodiment of the invention difunctional reactant (1) is one which is represented by the general formula (X) 

where R' has the same meaning as given hereinbefore with reference to Formula VI. In this embodiment difunctional reactant (2) can be, for example, a compound represented by the general formula (XI) 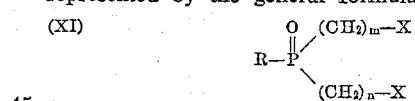

where R, m and n have the same meanings as given hereinbefore with reference to Formula I, and X has the same meaning as previously has been given with reference to Formula IX.

In still another embodiment of the invention difunctional reactant (1) is one which is represented by Formula VIII and difunctional reactant (2) is one which is represented by Formula XI, thereby producing water-soluble linear polymers consisting essentially of the recurring unit structure represented by Formula VII.

In the foregoing description of the reactants wherein reference is made to compounds containing an amide-forming group, it will be understood, of course, by those skilled in the art that such groups are the sole reactive groups which are present therein. This expression, "sole reactive groups," as used herein is not intended to include within its meaning any olefinic or acetylenic unsaturation between adjacent carbon atoms as in, for example, the ethylenically and acetylenically unsaturated aliphatic dicarboxylic acids. The expression, "reactive groups," refers to groups which are reactive in the condensation reaction involved in this invention.

When a dicarboxylic acid (either preformed or formed in situ) is employed, the first product that is formed when it is brought into reactive relationship with the diamine is a diamine-dicarboxylic acid salt, which is usually crystalline in nature and readily purified by recrystallization from a suitable solvent. This salt may be employed as the starting material in forming the linear condensation polyamide.

By the above-described general methods, the polymer-forming reaction is continued by removing the condensation fragments (water, alcohol, ammonia, etc.), e.g., by heating and/or vacuum. The temperatures employed are generally within the range of from about 150° C. to about 325° C.

The reaction may be carried out in the presence or absence of a suitable inert, liquid, reaction medium (solvent or diluent), for example in an acidic solvent such as, for instance, phenols, cresols, or solvents such as dimethylformamide or other highly polar solvents; or in diluents (that is, liquid media in which the reactants are substantially insoluble), e.g., high-boiling aliphatic or aromatic hydrocarbons, or ethers such as diphenyl ether, etc. It is continued until a linear polyamide having the desired average molecular weight as indicated, for instance, by its reduced viscosity is obtained. For example, the reaction may be continued until a polymer having a reduced viscosity in formic acid at 30° C. of at least 0.1 dl./g. or higher at a concentration of 0.1 g./100 cc. is obtained.

In order that those skilled in the art may better understand how the present invention can be carried into effect, the following examples are given by way of illustration and not by way of limitation. All parts and percentages are by weight unless otherwise stated.

The polyamides described in the following examples were prepared by reacting the monomeric components together in the absence of any solvent. The process was carried out in two stages. In the first stage the monomers (purified amine salts or weighed equivalent amounts) were heated in sealed glass tubes under a nitrogen atmosphere to begin the polymerization process. The second stage involved the gradual reduction of pressure in the system and increase in reaction temperature to remove the water eliminated in the reaction and to bring about high polymer formation. The polymers were removed from the reaction tubes by cooling the tube and polymer therein in liquid nitrogen, breaking the tube and separating the polymer plug from the glass. The polymers were then placed in a vacuum desiccator, stored for about 16 hours and their properties determined. The reduced viscosities were determined as previously has been described. The softening points and flow temperatures were determined by heating the sample on a Fisher-John's melting-point apparatus. The softening point is the temperature at which the sample becomes tacky and compressible under mild probing. The flow temperature is that temperature at which the sample becomes fluid.

*Example 1*

This example illustrates the preparation of a water-soluble linear polyamide from bis(3-aminopropyl)methylphosphine oxide, the formula for which is (XII)
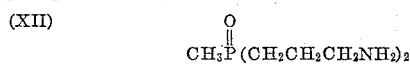

and adipic acid.

A mixture of the compound of Formula XII (12.126 g.; 0.0681 mole) and adipic acid (9.94 g.; 0.0681 mole) is placed in a heavy-walled glass tube, deaerated and sealed. The mixture is kept at 200° C. for 1.5 hours and at 250° C. for 1.5 hours. After cooling, the second stage of the polymerization is carried out at a low pressure while raising the temperature from 250° C. to 290° C. over a three-hour period. The polymer is removed by immersing it in liquid nitrogen and breaking the tube. The product is a hard, tough, transparent, slightly off-color solid having a reduced viscosity of 0.60 dl./g. It dissolves on standing for two hours in water at room temperature (20°–30° C.). It softens at 45°–50° C. and flows at 75°–150° C. It has a flexural strength of 5800 p.s.i.; Young's modulus, $0.46 \times 10^{-6}$ p.s.i.

A different sample of a linear polyamide that had been prepared from the same reactants under essentially the same conditions was found to have the following properties:

| | |
|---|---|
| Appearance | Hard, tough, transparent and colorless solid. |
| Reduced viscosity | 1.2 dl./g. |
| Softening temperature | 90° C. |
| Flow temperature | 165° C. |
| Tensile strength [1] of bond between two pieces of aluminum, p.s.i. | 9100. |
| Density | 1.2. |
| Solubility characteristics | Insoluble in chlorobenzene, hexane, acetone, chloroform, and dimethylformamide. Soluble in water, 2B alcohol, 5% aqueous HCl, cresol, formic acid and $CF_3(CF_2)_5CH_2OH$. |

[1] The tensile strength, in this and other examples, of the bond between two pieces of metal (aluminum, copper, steel) is determined in the manner described in our copending application Serial No. 834,668, filed August 19, 1959, now Patent No. 3,043,810.

*Example 2*

The procedure is essentially the same as described under Example 1 with the exception that the water soluble linear polyamide is produced from approximately equal molar proportions of bis(4-aminobutyl)ethylphosphine oxide and malonic acid. Similar results are obtained.

*Example 3*

In this example the linear polyamide is prepared by effecting a condensation reaction, as described under Example 1, between substantially equivalent molar proportions of bis(5 - amino - n - pentyl)isopropylphosphine oxide and pimelic acid. Similar results are secured.

*Example 4*

Essentially the same procedure is followed as described under Example 1 with the exception that the diamine employed is (3-aminopropyl)(4-aminobutyl)methylphosphine oxide. The resulting linear polyamide has the following properties:

| | |
|---|---|
| Appearance | Hard, tough, transparent and colorless solid. Becomes tacky on exposure to air. |
| Reduced viscosity | 0.91 dl./g. |
| Softening temperature | 70°–80° C. |
| Flow temperature | 145°–147° C. |
| Tensile strength of bond between two pieces of aluminum | 10,040. |
| Density | 1.15. |
| Solubility characteristics | Insoluble in chlorobenzene, hexane, acetone, acetonitrile, chloroform, dimethylformamide, ether tetrahydrofuran, methylethyl ketone, dioxane, benzene, nitromethane and pyridine. Soluble in water, 2B alcohol, 5% aqueous HCl, $CF_3(CF_2)_5CH_2OH$ cresol, formic acid, methanol, dimethyl sulfoxide, ethylene glycol and 5% aqueous NaOH. |

Another sample that had been prepared from the same reactants and which had a reduced viscosity of 0.51 dl./g. showed the following adhesive strengths of the bond between two pieces of the specified metals.

| Metal: | P.s.i. |
|---|---|
| Aluminum | 9000 |
| Copper | 7000 |
| Steel | 5300 |

The lap shear tensile strength of the bond on aluminum was 3500 p.s.i. (The method of making this determination is described in our aforementioned copending application Serial No. 834,668.) The Izod impact strength of the bond on aluminum was 0.48 ft. lbs./in. With glass blocks, the bond therebetween did not fail but the blocks themselves failed at above 1200 p.s.i.

Coating, impregnating, laminating, adhesive, textile-finishing and other film-forming compositions are produced by dissolving the linear polyamides of this example (as well as of other examples herein) in water, for instance in proportions ranging from about 1% to about 20% by weight, of the total amount of water and of the polyamide. Depending upon the particular viscosity desired for the particular application, compositions can thus be prepared containing, by weight, 1%, 2%, 5%, 10%, 15% or 20% of the polyamide. If desired, part of the water can be replaced by another solvent which is miscible with water, e.g., alcohol. Dyes, pigments, fillers and any of the other additives commonly incorporated in compositions of this kind can be included.

*Example 5*

A mixture of bis(3-aminopropyl)methylphosphine oxide (1.8 g.; 0.01 mole) and dimethyloxalate (1.19 g.; 0.01 mole) is placed in a heavy-walled glass tube, deaerated and sealed. The reactants are heated for two hours at 200°–250° C. in the first stage and at 230°–250° C. for two hours in the second stage. The resulting linear polyamide is a hard, brittle, orange-colored solid with a reduced viscosity of 0.14 dl./g. It is soluble in water. It softens at 45° C. and flows at 70°–90° C.

Instead of the particular diamine employed above, one can use any other diamine embraced by Formula VIII, the names of which will be apparent to those skilled in the art from the definitions of R, $m$ and $n$.

*Example 6*

Into a heavy-walled glass tube is placed a mixture of 1.86 g. (0.01 mole) of bis(3-aminopropyl)methylphosphine oxide and 2.11 g. (0.01 mole) of sebacic acid. After deaerating and sealing the tube, the reactants are heated therein for two hours at 200° C. in the first stage, raising the temperature from 200° C. to 270° C. over a period of one hour in the second stage, and then maintaining the temperature at 270° C. for 2¼ hours. The resulting linear polyamide is a pale yellow, hard, tough, transparent solid which is soluble in water. It has a reduced viscosity of 0.63 dl./g. It softens at 40° C. and flows at 70°–80° C.

*Example 7*

This example illustrates the preparation of a water-soluble linear polyamide from bis(3-aminopropyl)methylphosphine oxide and a salt of terephthalic acid. This salt is prepared as follows:

A solution of 3.20 g. of bis(3-aminopropyl)methylphosphine oxide dissolved in 5 ml. of ethanol is added to a hot ethanolic slurry of 2.49 g. of terephthalic acid. The volume of the mixture is brought to 200 ml. by adding additional solvent. A further amount (15–20 ml.) of water is then added to give a clear solution. On reducing the volume of 100 ml. and adding a few ml. of ether, the salt is precipitated. The salt is isolated by filtration and dried for about 16 hours in a vacuum desiccator.

The polyamide is prepared by heating the dried salt for two hours at 260° C. (first stage) and for the same length of time at the same temperature in the second stage. The resulting linear polyamide is a yellow, hard brittle solid having a reduced viscosity of 0.17 dl./g. It dissolves when heated in water. It softens at 102°–105° C. and flows at 140°–160° C.

*Example 8*

This example illustrates the preparation of a water-soluble linear polyamide by effecting a condensation reaction between bis(carboxyethyl)methylphosphine oxide and hexamethylenediamine.

A mixture of bis(carboxyethyl)methylphosphine oxide (2.83 g.; 0.0135 mole) and 1.576 g. (0.0135 mole) of hexamethylene diamine is heated in a sealed tube under nitrogen for ½ hour at 200°–220° C. The mixture at this point is a cloudy, viscous slush. On raising the temperature from 220° C. to 300° C. over a 2¼-hour period the heterogeneity is not changed. The tube is cooled and prepared for stripping under vacuum. Stripping is accomplished by heating for one hour at 270° C.

The resulting linear polyamide is a hard, yellowish, brittle, transparent solid having a reduced viscosity of 0.50 dl./g. It is soluble in water and softens at 70° C. It consists essentially of the recurring unit structure embraced by Formula VI.

*Example 9*

A water-soluble linear polyamide which consists essentially of the recurring unit structure embraced by Formula VII is prepared in essentially the same manner described under Example 8 but using, instead of hexamethylenediamine, an equivalent amount (0.135 mole) of bis(3-aminopropyl)methylphosphine oxide.

If desired, one can use in place of bis(3-aminopropyl)methylphosphine oxide an equivalent amount of any other diamine embraced by Formula VIII; and, in place of bis(carboxyethyl)methylphosphine oxide, an equivalent amount of any other difunctional reactant containing two amide-forming groups that is embraced by Formula XI.

It will be understood, of course, by those skilled in the art that our invention is not limited to the specific reactants or other ingredients employed in the foregoing examples, or to the specific procedure and conditions of reaction described in the individual example. Thus, instead of the particular difunctional reactants employed in the individual examples one can use any of the reactants embraced by Formula VIII with any of the reactants embraced by Formula IX or by Formula XI; or, one can employ any of the reactants embraced by Formula X with any of the reactants embraced by Formula XI. Instead of the dicarboxylic acid employed in a particular example as the difunctional reactant with the diamine, one can use oxalic acid especially in the form of an ester thereof or any other dicarboxylic acid having, as its sole reactive groups, two —COOH groups attached directly to a divalent hydrocarbon radical containing from 1 to 8 carbon atoms, inclusive, or the anhydrides or acyl halides or other amide-forming derivatives of such acids if available. More specific examples of such dicarboxylic acids and other amide-forming compounds are the following: malonic, succinic, glutaric, adipic, pimelic, suberic, azelaic, sebacic, 2-octenedioic, maleic, fumaric, itaconic, and the amide-forming derivatives thereof, e.g., the available anhydrides thereof, the acyl chlorides, acyl bromides and other acyl halides thereof, the esters thereof, nitriles thereof, etc. Other examples will be apparent to those skilled in the art from the aforementioned illustrative examples of divalent hydrocarbon radicals containing from 1 to 8 carbon atoms, inclusive, that are represented by R′ in Formulas V and VI.

We claim:

1. A water-soluble linear polyamide consisting essentially of the recurring unit structure represented by the general formula

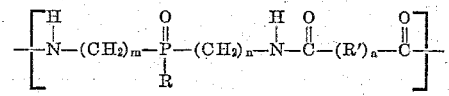

where R represents a lower alkyl radical, R' represents a divalent hydrocarbon radical containing from 1 to 8 carbon atoms and "a" is 0-1 inclusive, and m and n each represent an integer from 1 to 5, inclusive.

2. A water-soluble linear polyamide as in claim 1 wherein R represents a methyl radical and m and n each represent 3.

3. A water-soluble linear polyamide as in claim 1 wherein R represents a methyl radical, m represents 3 and n represents 4.

4. A water-soluble linear polyamide as in claim 1 wherein R' represents a divalent saturated aliphatic hydrocarbon radical containing from 4 to 8 carbon atoms, inclusive.

5. A water-soluble linear polyamide consisting essentially of the recurring unit structure represented by the general formula

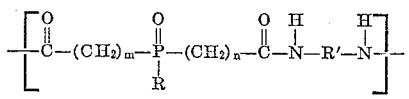

where R represents a lower alkyl radical, R' represents a divalent hydrocarbon radical containing from 1 to 8 carbon atoms, inclusive, and m and n each represent an integer from 1 to 5, inclusive.

6. A water-soluble linear polyamide as in claim 5 wherein R represents a methyl radical and m and n each represent 2.

7. A water-soluble linear polyamide consisting essentially of the recurring unit structure represented by the general formula

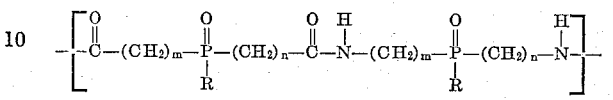

where each R represents a lower alkyl radical, and m and n each represent an integer from 1 to 5, inclusive.

References Cited in the file of this patent
UNITED STATES PATENTS

| | | |
|---|---|---|
| 2,646,420 | Morgan | July 21, 1953 |
| 3,043,810 | Deichert et al. | July 10, 1962 |

OTHER REFERENCES

Korshak: Journal of Polymer Science, vol. 31, 319–326 represent 2.